United States Patent

Brown et al.

[15] 3,689,004
[45] Sept. 5, 1972

[54] REPLACEMENT CARTRIDGE FOR A COILABLE RULE

[72] Inventors: Martin M. Brown, Canton; Carl C. Stoutenberg, Hartford, both of Conn.

[73] Assignee: The Stanley Works, New Britain, Conn.

[22] Filed: May 12, 1971

[21] Appl. No.: 142,509

[52] U.S. Cl. ............................. 242/107 R, 242/107.6
[51] Int. Cl. .......................... G01b 3/10, B65h 75/48
[58] Field of Search.........242/107 R, 107 S B, 107.1, 242/107.11, 107.12, 107.2, 107.3, 107.4, 107.5, 107.6; 33/138

[56] References Cited

UNITED STATES PATENTS

| | | |
|---|---|---|
| 1,804,975 | 5/1931 | Eisenstein..............242/107 R |
| 2,767,426 | 10/1956 | Grupp.................242/107.5 X |
| 3,033,488 | 5/1962 | Weber....................242/107.5 |
| 3,482,798 | | Kawaguchi.............242/107.3 |
| 3,547,371 | 12/1970 | Carnsek....................242/107 |

FOREIGN PATENTS OR APPLICATIONS

| | | |
|---|---|---|
| 867,886 | 5/1961 | Great Britain...............33/138 |

*Primary Examiner*—Werner H. Schroeder
*Attorney*—Prutzman, Hayes, Kalb & Chilton

[57] ABSTRACT

A replacement cartridge for a coilable rule wherein a form-sustaining spool mounts a coiled measuring blade and a recoil spring. The hub of the rule is separable from the spool and the recoil spring is attached thereto. The hub has an integral keeper which overlies the coiled measuring tape and is engaged by the hook at the end of the blade for maintaining the integrity of the replacement cartridge until it is inserted in the casing for the tape.

5 Claims, 3 Drawing Figures

INVENTORS
MARTIN M. BROWN
CARL C. STOUTENBERG

BY Pritzman, Hayes, Kalb and Chilton

ATTORNEYS

REPLACEMENT CARTRIDGE FOR A COILABLE RULE

This invention generally relates to coilable rules and more particularly to an improvement in a replacement cartridge for a coilable rule of the type shown and claimed in copending application Ser. No. 34,080, filed May 4, 1970, entitled Coilable Rule and Replacement Cartridge Therefor, and assigned to the assignee of the present invention.

The principle object of this invention is to provide an improved foolproof factory preassembled replacement cartridge for a coilable rule.

Other objects will be in part obvious and in part pointed out more in detail hereinafter.

The invention accordingly consists in the features of construction, combination of elements and arrangement of parts which will be exemplified in the construction hereafter set forth. In the drawings.

Figure 1:
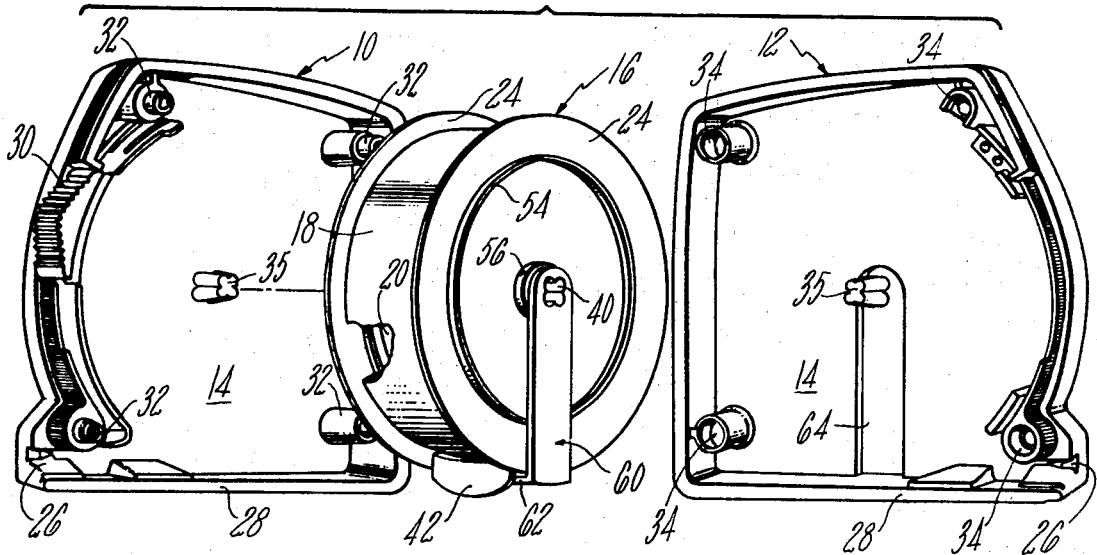
FIG. 1 is an exploded view, partly broken away, of a coilable rule constructed in accordance with the present invention.

Referring to the drawing, FIG. 1 is an illustrative embodiment of the present invention and discloses a coilable rule comprising a pair of mating casing halves 10 and 12 which are joined together to define a chamber 14 for receiving a spool 16. A coilable measuring blade 18 and a recoil spring 20 are mounted on spool 16 with the coiled measuring blade 18 being supported in coiled position on laterally extending flanges 22 provided by the side discs 24 of the spool 16. The recoil spring 20 is supported between the side discs 24 radially inwardly of the coiled measuring blade 18 and the flanges 22 in a usual manner. The casing is provided with a mouth 26 adjacent the bottom wall 28 through which the measuring blade 18 extends.

The illustrative coilable rule is shown as being provided with a manually operated brake member 30 to lock the tape blade 18 in adjusted extended position as more fully disclosed and claimed in U.S. Pat. No. 3,214,836.

The casing halves 10, 12 are generally mirror images of each other with casing half 10 being provided with hollow posts 32 which are received in mating sockets 34 provided in casing half 12. Fasteners such as screws may be passed through the sockets 34 and threaded into the posts 32 to hold the casing together.

The inner end of the recoil spring 20 is anchored to a removable hub 37 by being inserted in a nonradial slot 28 in the hub. The ends of removable hub 36, which may be formed of a suitable molded plastic, are shown as being provided with apertures 40 of noncircualar cross-section to receive the mating truncated studs 35 respectively provided on casing halves 10, 12 to hold the hub against rotation while permitting it to be readily removed for replacement.

The inner end of the measuring blade 18 is connected to the outer end of recoil spring 20 in any suitable manner so as to automatically be retracted into coiled position in the chamber 14 under the bias of the recoil spring 20 when the measuring blade is released from an extended position. The free end of the measuring blade is provided with a suitable hook 42, as shown in FIG. 1, to prevent the free end of the blade form passing through the mouth 26 of the casing when the measuring blade 18 is released and is retracted into the casing under the bias of spring 20.

In measuring tapes of the general type described, the measuring blade 18, or the recoil spring 20, sometimes becomes damaged and requires replacement. In the past, such replacement has required special assembly skill and a trial and error procedure to adjust the recoil spring 20 to the level of tension required for satisfactory performance. Because of the difficulties in replacing the blade and achieving the proper tension level, the entire rule, which is repairable, is frequently discarded in favor of a new coilable rule.

Figure 2:
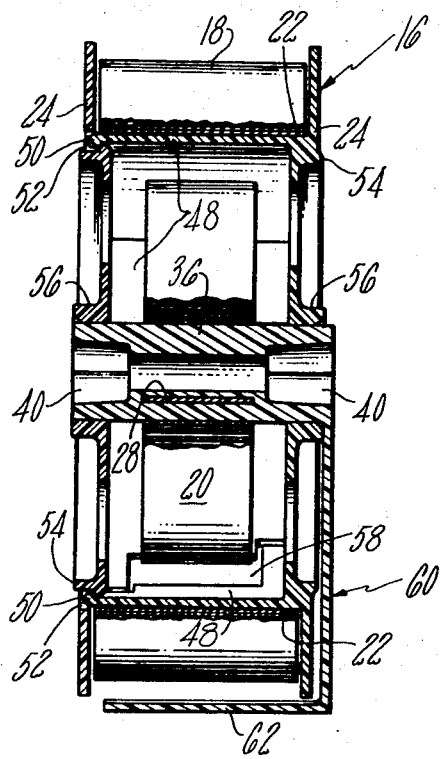
FIG. 2 is an enlarged cross-sectional view of a replacement cartridge incorporating the invention including a keeper for maintaining the integrity of the replaceable cartridge before installation.
Figure 3:
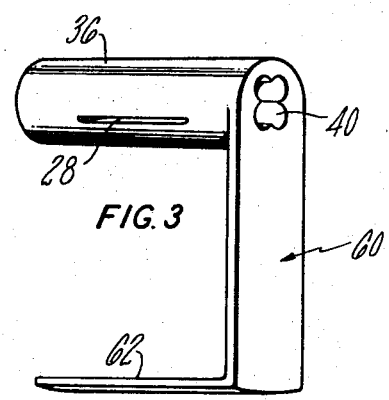
FIG. 3 is an enlarged perspective view of the free hub construction forming part of the invention.

The present invention provides a novel construction which makes it possible to replace a damaged blade by installing a factory assembled replacement cartridge which can be readily accomplished without special tools or skills. As shown in FIG. 2, such a replacement cartridge is provided with a removable hub 36 to which the inner end of the recoil spring 20 is secured with the recoil spring being factory adjusted to a precisely fixed level of tension so that the repaired rule will operate with the same quality of performance as a new rule.

In the replacement cartridge of FIG. 2, the spool comprises a form-sustaining construction to maintain its assembled relationship during shipment and installation. As illustrated, the spool is formed of a pair of molded plastic identical disc member 24 having peripheral flanges 22 providing an annular support for the innermost coil of the measuring blade 18 when it is in its coiled position. The flanges 22 of each of the disc members 24 are extended laterally to provide a pair of circumferentially spaced arcuate flanges 48 disposed 180° apart. The two disc members 24 are assembled with the flanges 48 thereof being interdigitated and the beaded ends 50 thereof snap-fitted into mating slots 52 provided in the opposite disc member 24.

The outer side of each of the discs is provided with an annular rib 54 which engages the inner surface of the casing halves 10 and 12 to provided a bearing surface of uniform limited frictional resistance for smooth operation of the rule. Each of the discs is provided with a central annular flange 56 which is journalled on the removable hub 36 as shown in FIG. 2.

The cavity between the discs radially inwardly from the flanges 48 provides a chamber for recoil spring 20 and the flanges are circumferentially spaced as at 58 so that the outer end of the recoil spring may pass therethrough and be connected to the inner end of the measuring blade 18.

The replacement cartridge of FIG. 2 is assembled in the factory with the recoil spring 20 adjusted to he desired tension and the measuring blade 18 is coiled about the flanges 48. A keeper 60, formed integrally with the hub 36, is provided with an inwardly projecting arm 62 which overlies the coiled measuring blade and is engaged by hook 42 to prevent the blade from unwinding during shipment and assembly.

With the assembly shown in FIG. 2, all that is required to replace the blade is to disassemble the casing halves 10, 12, remove the old spool together with the measuring blade 18, the coiled spring 20 and the hub 36, insert the replacement cartridge of FIG. 2 with the end of the measuring blade 18 projecting through the mouth 26 of the casing, and position the keeper 60 in the recess 64 with the truncated stud 35 received in the aperture 40 of the hub 36. When so assembled, the other casing half is assembled over he replacement cartridge and the fasteners reinstalled to maintain the casing halves together.

It will be apparent that the replacement cartridge may be installed without loss of the proper factory adjusted tensions of the recoil spring 20 so that the tape with the repaired rule performs with the quality of a new rule.

From the foregoing it will be readily apparent that the present invention provides an improved coilable rule having a free or removable hub construction and further provides for the repair of the rule with a replacement cartridge factory adjusted to provide new rule performance in a repaired rule.

As will be apparent to persons skilled in the art, various modifications, adaptions and variations of the foregoing specific disclosure can be made without departing from the teachings or the present invention.

We claim:
1. A replacement cartridge for a coilable rule comprising a form-sustaining spool mounting a coiled measuring blade having a hook at the end thereof, said spool having a centrally disposed aperture, a removable hub received within said aperture, a recoil spring having one end secured to said hub and the other end secured to the inner end of said measuring blade, a keeper arm fixed to said hub and overlying said coiled measuring blade and engaged by said hook to prevent the rotation of said hub relative to said spool.

2. The replacement cartridge of claim 1 wherein said spool has side walls and an annular flange extends between the side walls of the spool, said flange mounting the coiled measuring blade thereon.

3. A device as recited in claim 1 wherein said keeper arm is secured to said hub by a radial arm disposed at the end of said spool.

4. A device as recited in claim 3 including a casing defining a chamber therein, said casing being provided with a noncircular projection and said hub being provided with a mating noncircular projection received within the recess to mount and fix said hub member against rotation relative to said casing member under the bias of the recoil spring.

5. A device as recited in claim 4 wherein said casing is provided with a recess receiving said radial arm.

* * * * *